(No Model.) 2 Sheets—Sheet 1.

J. W. VAN ORDER.
SEED PLANTER.

No. 359,041. Patented Mar. 8, 1887.

WITNESSES: Chas. Nida, C. Sedgwick

INVENTOR: J. W. Van Order
BY Munn & Co.
ATTORNEYS.

(No Model.) 2 Sheets—Sheet 2.
J. W. VAN ORDER.
SEED PLANTER.
No. 359,041. Patented Mar. 8, 1887.
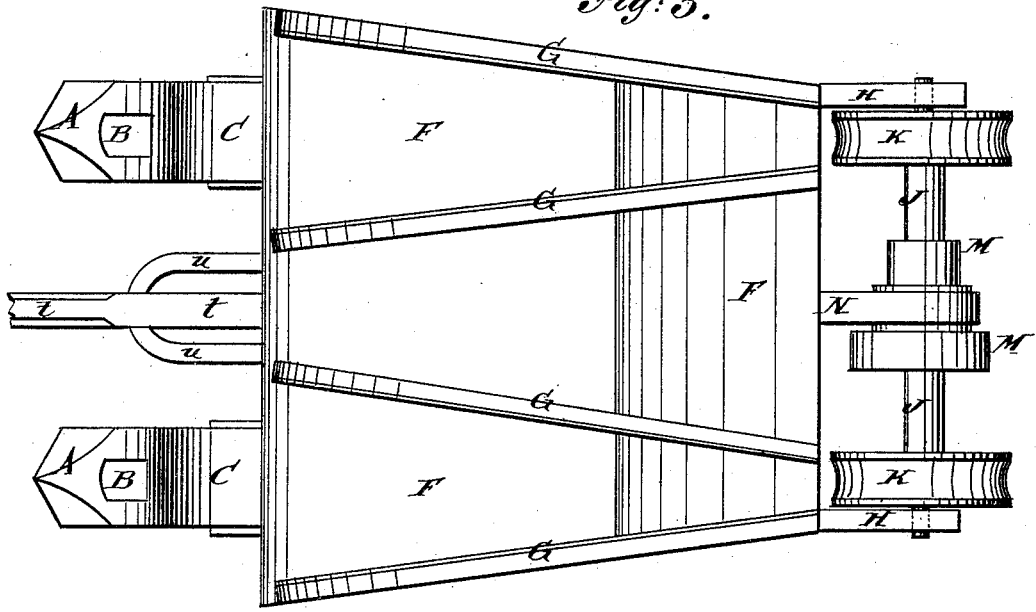
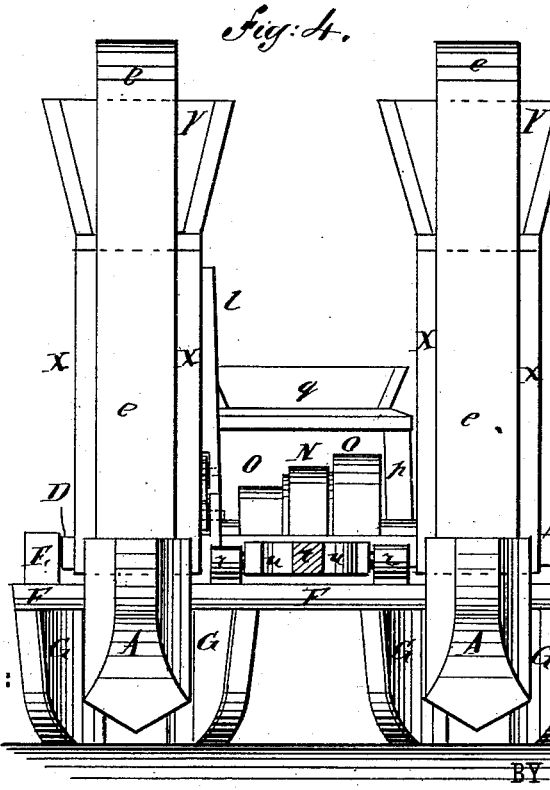
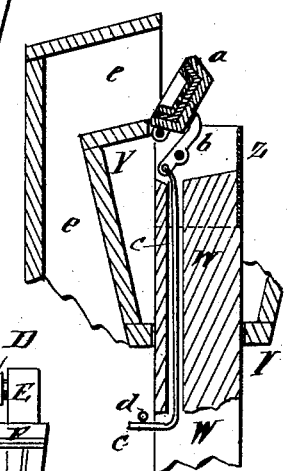
WITNESSES:
Anas. Nida.
C. Sedgwick.
INVENTOR:
J. W. Van Order
BY Munn & Co.
ATTORNEYS.

UNITED STATES PATENT OFFICE.

JACOB W. VAN ORDER, OF ARLINGTON, OREGON.

SEED-PLANTER.

SPECIFICATION forming part of Letters Patent No. 359,041, dated March 8, 1887.

Application filed June 28, 1886. Serial No. 206,474. (No model.)

*To all whom it may concern:*

Be it known that I, JACOB W. VAN ORDER, of Arlington, in the county of Gilliam and State of Oregon, have invented a new and useful Improvement in Seed-Planters, of which the following is a full, clear, and exact description.

Reference is to be had to the accompanying drawings, forming a part of this specification, in which similar letters of reference indicate corresponding parts in all the figures.

Figure 1:
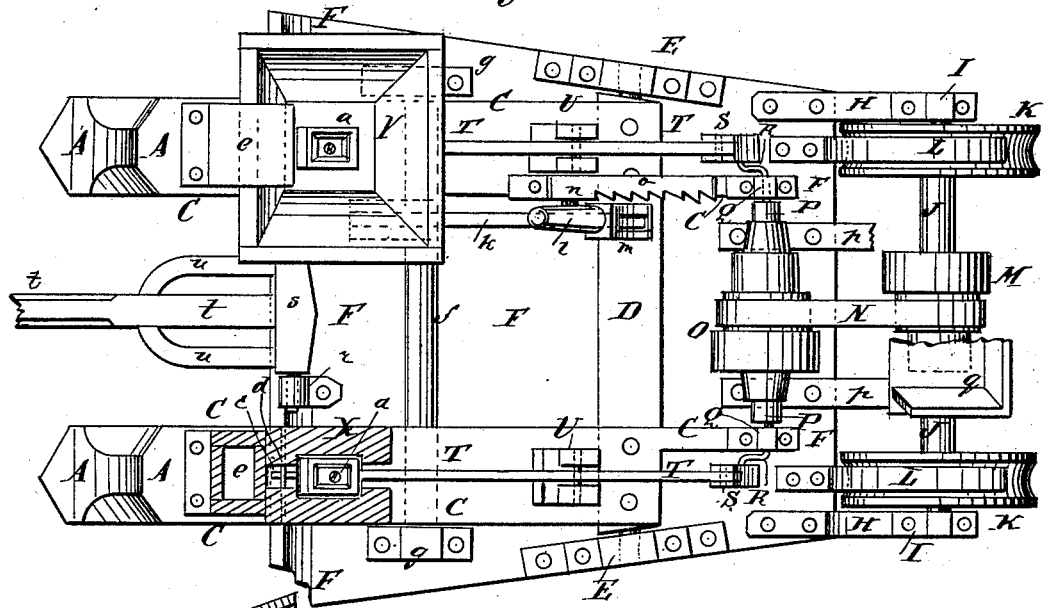
Figure 2:
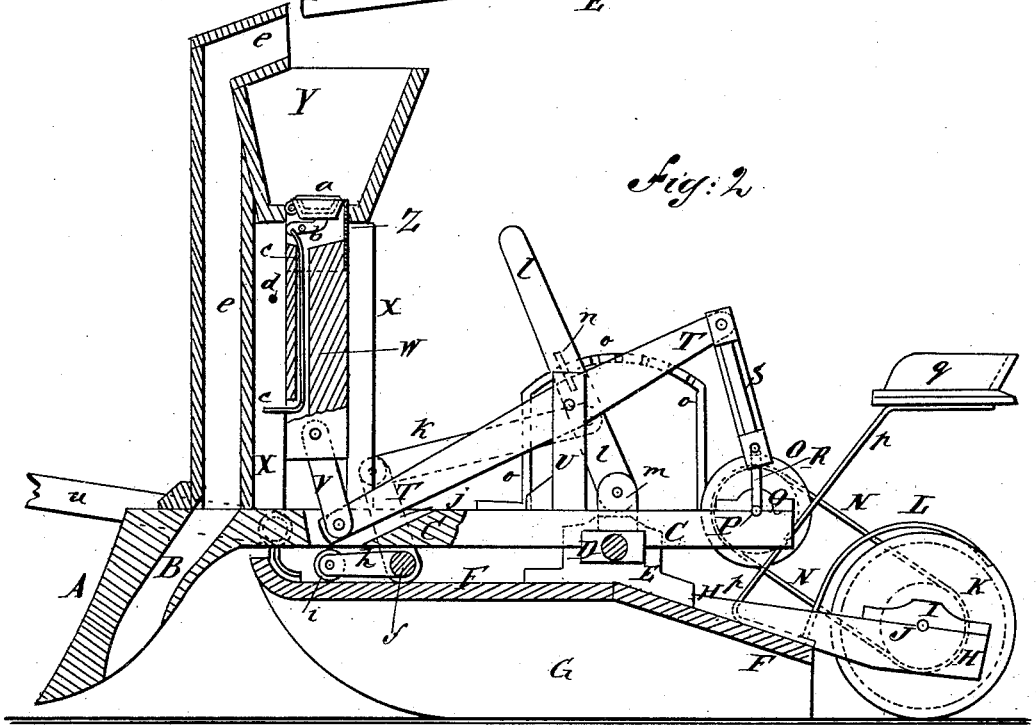

Figure 1 is a plan view of my improved seed-planter, partly in section and part being broken away. Fig. 2 is a sectional side elevation of the same. Fig. 3 is an under side view of the same. Fig. 4 is a front elevation of the same. Fig. 5 is a sectional side elevation of a part of the same, showing the seed-dropping cup in position to discharge seed.

The object of this invention is to provide seed-planters constructed in such a manner that they can be readily adjusted to plant sugar-cane, broom-corn, corn, beans, potatoes, and other seeds, and which shall be reliable in operation.

The invention consists in the construction and combination of various parts of the seed-planter, as will be hereinafter fully described and claimed.

The furrows are opened to receive the seed by plows A, in the rear parts of which are formed or to them are attached spouts B, to conduct the seed to the bottoms of the furrows before the said furrows have been partially filled by the falling in of the soil. The plows A are attached to the forward ends of beams C, which are attached, at points a little in the rear of their centers, to the end parts of a shaft, D. The ends of the shafts D are journaled in bearings E, attached to the side parts of the platform F, at a little distance from its rear edge. The platform F is attached to the upper edges of covering-runners G, two pairs of which are used. The runners G of each pair are inclined toward each other toward their rear ends, so that the said runners will press the soil into the furrows and cover the seed. The sides of the runners G that bear against the soil are faced with metal plates to prevent them from being worn by the friction of the soil. The rear parts of the runners G are beveled upon their upper edges, as shown in Fig. 2, so that the rear part of the platform F will have a downward inclination to provide space for the downward movement of the rear ends of the plow-beams C when the forward ends of the said plow-beams are raised.

To the rear corners of the platform F are attached the forward ends of arms H, the rear ends of which project, and to them are attached bearings I for the journals of the axle J. To the axle J, near each end and directly in the rear of the spaces between the runners G, are attached wheels K, the faces of which are made wide and are concaved, as shown in Figs. 1 and 3, to adapt them to serve as rollers to press the soil down upon the seed and to round up the soil above the seed to prevent the plants, when small, from being injured by clods and lumps rolling upon them as they are being cultivated the first time.

To the rear part of the platform F, directly in front of the wheel-rollers K, are attached scrapers L, which pass over the tops of the said wheel-rollers and have their engaging ends so formed as to fit upon the concaved faces of the said wheel-rollers and scrape off any soil that may adhere to them.

To the middle part of the axle J is secured a cone-pulley, M, around which passes an endless chain or other belt, N. The belt N also passes around a cone-pulley, O, attached to the shaft P, so that the speed of the said shaft can be regulated by adjusting the belt N upon the cone-pulleys M O.

The shaft P is journaled in bearings Q, attached to the rear end of the beams C, and to the ends of the said shaft are secured parallel cranks R, to which are pivoted the lower ends of connecting-rods S. The upper ends of the connecting-rods S are pivoted to the rear ends of the levers T, which are fulcrumed at points a little in the rear of their centers to the upper ends of short standards U, attached to the middle parts of the beams C.

To the forward ends of the levers T are pivoted the lower ends of short connecting-bars V, the upper ends of which are pivoted to the lower ends of the bars W. The bars W slide up and down in boxes or other guides, X, attached at their lower ends to the forward parts of the beams C. The bars W fit into and slide up and down through apertures in the bottoms of the hoppers Y, attached to the upper end of the guide-boxes X.

In sockets formed in the upper ends of the bars W, by recessing the said upper ends or by attaching metallic straps Z to the said ends, are placed three (more or less) concentric cups, $a$, which are fastened together by a screw passing through the bottoms of the inner cups and screwing into the bottoms of the outer cups, so that the machine can be adjusted to drop more or less seed at a time, or to drop smaller or larger seeds by removing or inserting more or less of the inner cups. The outer cups, $a$, are hinged at their forward sides to the upper forward parts of the walls of the sockets in which the said cups are placed, as shown in Figs. 2 and 5.

The bottoms of the outer cups, $a$, rest upon the upwardly-bent rear ends of the short levers $b$, which are pivoted to the forward parts of the walls of the sockets in which the said cups are placed, and to the forward ends of the said levers are pivoted the upper ends of the trip-rods $c$, which pass down through perforations or grooves in the forward parts of the bars W, and have their lower ends bent forward, so as, when the said bars W are raised, to strike against stop-pins $d$, attached to the boxes or guides X, and operate the levers $b$, to swing the cups $a$ upward and discharge the seed contained in the said cups into the rearwardly-inclined upper ends of the conducting-spouts $e$, placed at the forward sides of the hoppers Y and guide-boxes X. The lower ends of the spouts $e$ are secured to the forward ends of the beams C in such positions that the channels of the said spouts will register with the upper ends of the channels of the spouts B in the plows A, so that the seed discharged into the upper ends of the said spouts $e$ will pass directly to the furrows opened by the said plows A, and will be covered by the runners G and roller-wheels K.

Upon the platform F, beneath the forward parts of the beams C, is placed a shaft, $f$, the ends of which are journaled to bearings $g$, attached to the side parts of the said platform. To the shaft $f$, beneath the beams C, are rigidly attached forwardly-projecting arms $h$, the outer ends of which are slotted, and to them, within the said slots, are pivoted rollers $i$, to rest against the lower sides of the beams C, to lessen the friction when the shaft $f$ is turned to raise or lower the forward ends of the beams C.

To the shaft $f$, between the beams C, is rigidly attached an upwardly-projecting arm, $j$, to the upper end of which is pivoted the forward end of a connecting-bar, $k$. The rear end of the connecting-bar $k$ is pivoted to a lever, $l$, the lower end of which is pivoted to a support, $m$, attached to the platform F. The upper end of the lever $l$ projects into such a position that it can be readily reached and operated by the driver to raise or lower the forward ends of the beams C, to regulate the depth to which the plows A enter the ground, or to raise the said plows above the ground or lower them into working position.

The lever $l$ has a stationary pawl, $n$, attached to or formed upon it to engage with the recesses of an arched catch-bar, $o$, the ends of which are bent downward and are attached to the beams C, so that the lever $l$ and the shaft $f$ and its arms $h$ will be held securely in any position into which they may be adjusted.

To the rear part of the platform F are attached the lower ends of standard $p$, to the upper ends of which is attached the driver's seat $q$.

To the forward part of the platform E, upon the opposite sides of and equally distant from its central line, are attached bearings $r$, in which are journaled the ends of a cross-bar, $s$, to the center of which is attached the rear end of the tongue $t$, the connection between the said tongue and cross-bar being strengthened by the hounds or braces $u$.

Having thus described my invention, what I claim as new, and desire to secure by Letters Patent, is—

1. The combination, with the hopper, the seed spout and guides below the hopper, of a vertically-moving slide in said guides, means for operating the slide, a swinging cup on the upper end of the slide and passing through an aperture in the hopper, a rod connected with said cup, and a stop in the path of a projection on said rod, whereby when the slide has carried the cup to a certain point the stop will cause the rod to positively tilt the cup, substantially as set forth.

2. The combination, with a platform having covering-runners, of bars journaled on the platform, plows at the forward ends of the bars in front of the covering-runners, seed-guides leading to the plows, a seed-dropping mechanism, a crank-shaft on the platform acting against the forward under sides of the said bars for raising the plows, an operating-lever, and a locking device therefor, substantially as set forth.

3. In a seed-planter, the combination, with the axle J, carrying the roller-wheels K, and the beams C, carrying the plows A, of the cone-pulley M, attached to the said axle, the belt N, the cone-pulley O, attached to the shaft P, journaled to the said beams, the cranks R, attached to the said shaft, the pivoted levers T, connected with the said cranks by bars S, the sliding bars W, connected with the said levers by bars V, and moving in guides X, the hoppers Y, attached to the said guides, the hinged cups $a$, and the lever $b$, rod $c$, and stop-pin $d$, for tilting the said cups, and the seed-conducting spouts $e$, attached to the said plow-beams and connected with the spouts of the plows, substantially as herein shown and described, whereby the seed will be dropped by the advance of the machine, as set forth.

4. In a seed-planter, the combination, with the platform F and the pairs of inclined runners G, attached to the said platform, of the rock-shaft D, journaled to the said platform, the plow-beams C, attached to the said rock-shaft, the plows A, attached to the said beams and provided with seed-conducting spouts B, the arms H, attached to the said platform, the axle J, journaled to the said arms, and the roller-wheels K, attached to the said axle and having concaved faces, substantially as herein shown and described, whereby furrows will be opened to receive seed, and the seed will be covered with soil and the soil packed and rounded up at the tops of the rows, as set forth.

5. In a seed-planter, the combination, with the platform F and the beams C and their shaft D, of the shaft $f$, having arms $h$, provided with rollers $i$, and having arm $j$, the bar $k$, pivoted to the said arm $j$, and the lever $l$, pivoted to the said bar $k$, substantially as herein shown and described, whereby the said beams and plows can be readily adjusted, as set forth.

JACOB W. VAN ORDER.

Witnesses:
W. G. BROWN,
H. G. HURLBURT.